(12) United States Patent
Fourney (10) Patent No.: US 6,968,941 B2
(45) Date of Patent: Nov. 29, 2005

(54) APPARATUS AND METHODS FOR CONVEYING OBJECTS

(75) Inventor: Matthew L. Fourney, Laurel, MD (US)

(73) Assignee: Materials Handling Systems, Inc., Savage, MD (US)

( * ) Notice: Subject to any disclaimer, the term of this patent is extended or adjusted under 35 U.S.C. 154(b) by 0 days.

(21) Appl. No.: 10/719,805

(22) Filed: Nov. 21, 2003

(65) Prior Publication Data

US 2005/0109582 A1    May 26, 2005

(51) Int. Cl.$^7$ ............................................. B65G 17/00
(52) U.S. Cl. .................. 198/779; 198/370.03; 198/384
(58) Field of Search ........................... 198/779, 370.03, 198/370.09, 384

(56) References Cited

U.S. PATENT DOCUMENTS

| | | | |
|---|---|---|---|
| 3,857,472 A | * | 12/1974 | Klint ........................... 198/384 |
| 6,073,747 A | * | 6/2000 | Takino et al. ........... 198/370.09 |
| 6,382,393 B2 | * | 5/2002 | Itoh et al. ............... 198/370.09 |
| 6,494,312 B2 | * | 12/2002 | Costanzo ..................... 198/779 |
| 6,571,937 B1 | * | 6/2003 | Costanzo et al. ........... 198/779 |
| 6,758,323 B2 | * | 7/2004 | Costanzo ............... 198/370.09 |

* cited by examiner

Primary Examiner—Richard Ridley
(74) Attorney, Agent, or Firm—Thomas, Kayden, Horstemeyer & Risley, LLP (57) ABSTRACT

Disclosed are conveyors and methods for making the conveyors. In one embodiment, a conveyor comprises a modular conveyor belt that includes a plurality of mat-top chains having a plurality of cavities and a plurality of first rollers disposed in the cavities of the mat-top chains. The conveyor further includes at least one second roller that operatively couples to the first rollers such that the first rollers rotate as the conveyor belt travels along the second roller. The invention can also be construed as providing the method for conveying objects. The method can comprise the steps of driving a modular conveyor belt in a direction of belt travel; rotating a plurality of first rollers disposed into the modular conveyor belt in a manner in which slippage of the first rollers is reduced; and conveying objects on the modular conveyor belt using the rotating first rollers.

26 Claims, 5 Drawing Sheets

APPARATUS AND METHODS FOR CONVEYING OBJECTS

TECHNICAL FIELD

The invention generally relates to power-driven conveyors.

DESCRIPTION OF THE RELATED ART

Switch conveyors have been developed that include a modular conveyor belt that includes rows of rollers. The rollers are disposed in the modular conveyor belt and are angled relative to the direction of travel of the belt such that they can laterally divert objects placed on the belt. The conveyor includes fixed longitudinal wear strips that are located below the conveyor belt. As the conveyor belt travels, the rollers travel along the longitudinal wear strips causing the rollers to rotate for the purpose of diverting objects.

The use of the wear strips to rotate the rollers causes the rollers to slip in that the rollers intermittently slide along the wear strips. Such slippage is undesirable in that it results in inconsistent or inefficient diverting of the objects.

SUMMARY

Disclosed are conveyors and methods for conveying objects. In one embodiment, a conveyor comprises a modular conveyor belt that includes a plurality of mat-top chains having a plurality of cavities and a plurality of first rollers disposed in the cavities of the mat-top chains. The conveyor further includes at least one second roller that operatively couples to the first rollers such that the first rollers rotate as the conveyor belt travels along the second roller.

In one embodiment, a method comprises driving a modular conveyor belt in a direction of belt travel; rotating a plurality of first rollers disposed into the modular conveyor belt in a manner in which slippage of the first rollers is reduced; and conveying objects on the modular conveyor belt using the rotating first rollers.

BRIEF DESCRIPTION OF THE DRAWINGS

The disclosed apparatus and methods can be better understood with reference to the following drawings. The components in the drawings are not necessarily to scale.

DETAILED DESCRIPTION

Disclosed are conveyors and methods for conveying objects that reduce slippage of conveyor rollers. Due to that reduced slippage, the conveyors more effectively divert objects on the conveyor belt. In some embodiments, the conveyor includes first rollers disposed in the conveyor belt and at least one second roller located underneath the conveyor belt that can rotate in a direction transverse to the direction of travel of the conveyor belt. As the conveyor belt travels along the second roller, the second roller operatively couples with the first rollers causing the first rollers and the second roller to rotate. Because of the rotation of the second roller, the first rollers rotate with reduced slippage.

Figure 1:
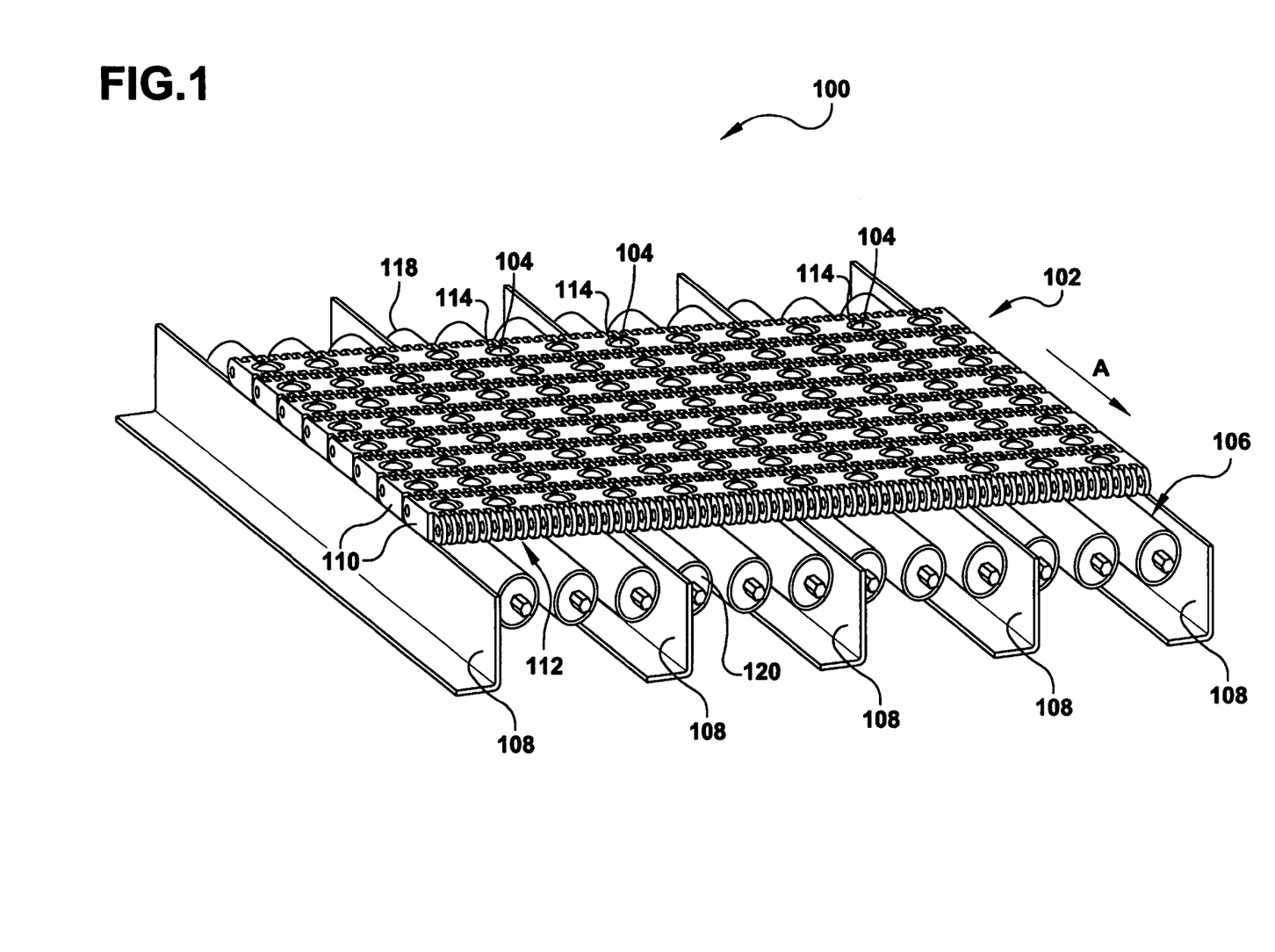
FIG. 1 is a perspective view of an embodiment of a section of a conveyor that includes a conveyor belt having a plurality of first rollers that are operatively coupled to a second roller.

Referring now in more detail to the figures in which like referenced numerals identifying corresponding parts, FIG. 1 illustrates a perspective view of an embodiment of a section of a conveyor 100 in which a plurality of first rollers 104 are disposed in a conveyor belt 102. As indicated in this figure, the conveyor belt 102 is modular and includes at least one mat-top chain 110. The mat-top chain 110 has a plurality of cavities 114, in which the first rollers 104 are disposed. By way of example, the first rollers comprise plastic wheels that include outer rubber layers or tires (see discussion of FIGS. 6A and 6B). That configuration increases friction between the first rollers 104 and surfaces that the rollers contact (i.e., the surfaces of the second rollers 106 described below) so as the reduce slippage of the first rollers. The first rollers 104 are aligned at an angle α (shown in FIG. 3) relative to the direction of the travel of the conveyor belt 102 so as to laterally divert objects conveyed by the conveyor belt. By way of example, α may range from approximately 20 to 70 degrees. Because the first rollers 104 are used to divert objects, the first rollers may be designated as diverting rollers. The mat-top chain 110 of FIG. 1 includes hinge elements 112 that can be used to link other mat-top chains 110 to form a continuous conveyor belt 102.

With further reference to FIG. 1, the conveyor 100 further includes a plurality of second rollers 106 and support members 108. The second rollers 106 are located underneath the conveyor belt 102 between the support members 108 and are free to rotate in a direction that is transverse, e.g., substantially perpendicular, to the direction of travel of the conveyor belt indicated by arrow A. By way of example, the second rollers 106 comprise elongated metal rollers that include eurethane outer sleeves. Because the second rollers 106 rotate in a direction that is transverse to the direction of travel of the conveyor belt 102, the second rollers 106 may be designated as transverse rollers. As the conveyor belt 102 travels in direction A along the second rollers 106, the second rollers can be positioned to engage the first rollers 104. Such engagement causes the first rollers 104 and the second rollers 106 to rotate. That rotation is facilitated by the high coefficient of friction that exists between the rubber layers of the first rollers 104 and the eurethane sleeves of the second rollers 106. As the first rollers 104 rotate along the second rollers 106, the first rollers pass over from first ends 118 to second ends 120 of the second rollers to trace a helical path 308 (shown in FIG. 3) on the second rollers. Because the second rollers 106 rotate when they engage the first rollers 104 as opposed to being fixed as prior art wear strips, the first rollers rotate with reduced slippage. In fact, after an initial start up period, the first rollers 104 rotate along the second rollers 106 with nearly no slipping. This, in turn, enables more effective diverting of the objects carried by the conveyor belt 102. For example, objects can be diverted more quickly, in a shorter amount of space (i.e., length of conveyor), or both.

In some embodiments, the second rollers 106 are vertically displaceable so as to be capable of being moved toward or away from the mat-top chain 110 to engage or disengage the first rollers 104. The vertical movement of the second rollers 106 can be facilitated by various components such as an air actuator, hydraulic actuator, ball screw actuator, or solenoid actuator. Alternatively, however, in cases in which the first rollers 104 are always to be driven, the second rollers 106 are not displaceable such that they continuously engage the first rollers as the conveyor belt 102 travels in direction A. In yet a further alternative, the second rollers 106 are horizontally displaceable so as to be brought into an out of contact with first rollers 104. Such an arrangement may be particularly advantageous in situations in which the conveyor belt is provided with transverse rows of first rollers 102 that alternatingly face different directions (e.g., a leftward direction, rightward direction, the leftward direction, and so forth across the row)). Horizontal displacement of the second rollers 106 in such a case may enable switching between diversion of objects in two separate (e.g., opposite) directions (e.g., from a leftward direction to a rightward direction and vice versa).

Figure 2:
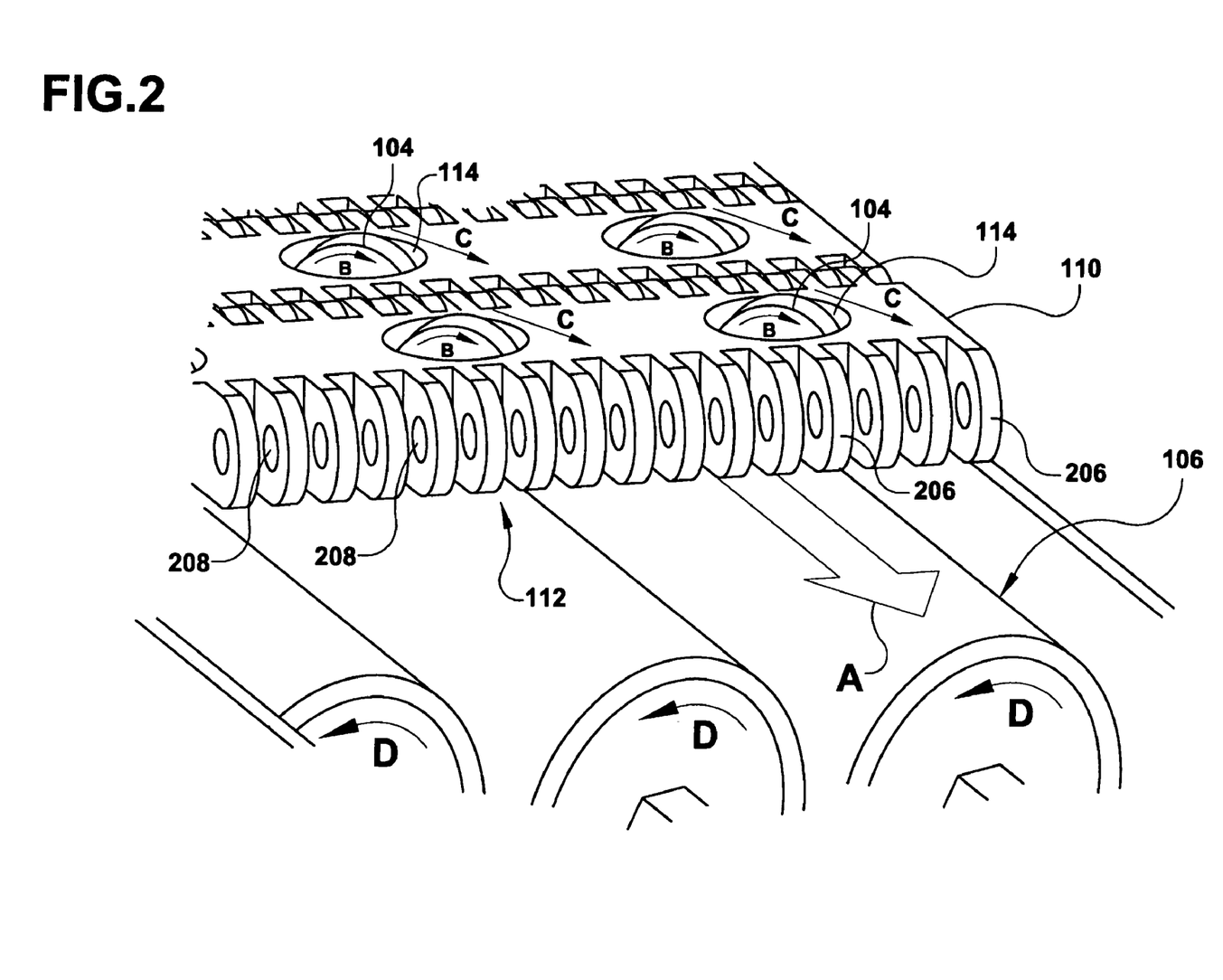
FIG. 2 is a detail view of a section of the conveyor of FIG. 1.

FIG. 2 is a detailed view of a section of the conveyor of FIG. 1. As shown in FIG. 2, the mat-top chain 110 includes hinge elements 112 that have multiple interleaved hinge elements 206, each of which has a hole 208 that is axially aligned with the hole 208 of an adjacent element 206. In order to link two mat-top chains 110, the axially-aligned holes 208 of the chains 110 are aligned and a rod (not shown) is placed through the axially-aligned holes 208. A plurality of mat-top chains 110 may therefore be linked together to form a continuous conveyor belt 102.

As described above, the mat-top chain 110 further includes cavities 114 in which the first rollers 104 are disposed and in which the first rollers can rotate. As the conveyor belt 102 travels in direction A, the second rollers 106 can be made to engage the first rollers 104 causing the first rollers to rotate in direction B. The objects on the conveyor belt 102 can therefore be conveyed in a direction C. Notably, the second rollers rotate in direction D.

Figure 3:
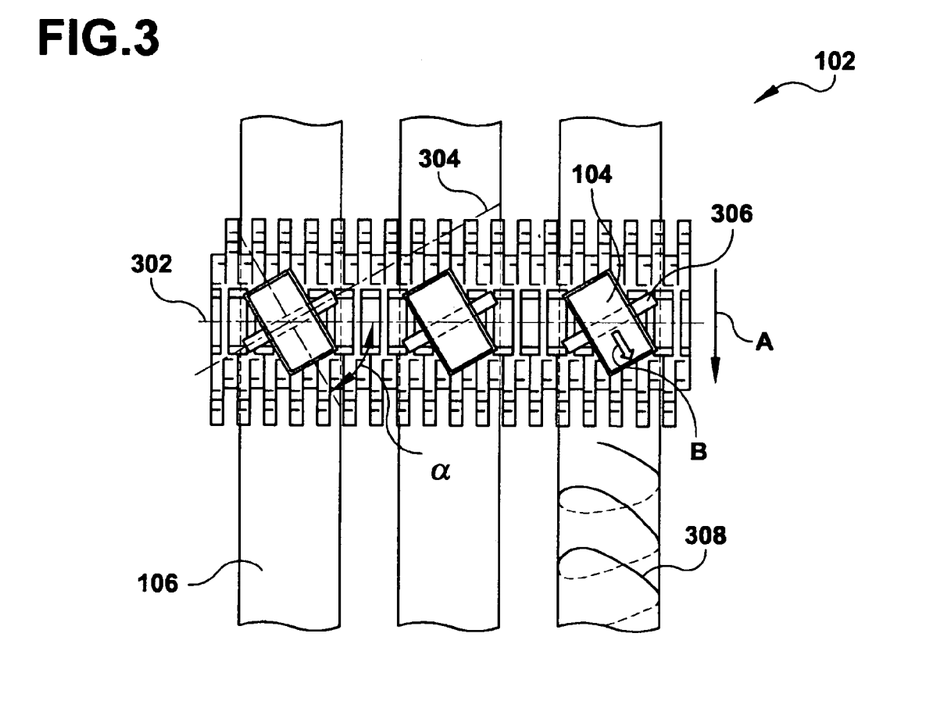
FIG. 3 is a top view of an embodiment of a section of the conveyor of FIG. 1.

FIG. 3 is a top view of an embodiment of a section of the conveyor of FIG. 1. In FIG. 3, the first rollers 104 are arranged along the axes 302. The mat-top chain 110 includes first roller axles 306 that are aligned on the rotational axes 304. The first roller axles 306 are coupled with the mat-top chain 110 and disposed within the cavities 114. The first roller axles 306 extend through openings of the first rollers 104 to enable the first rollers 104 to rotate about their axes 302 when engaged with the second rollers 106. The alignment of the first rollers 104 enables the first rollers 104 from below to convey objects on the conveyor belt 102 at an angle α relative to the direction of travel A.

As is further depicted in FIG. 3, the second rollers 106 are located underneath the conveyor belt 102 such that the second rollers 106 can engage the first rollers 104 from below as the belt travels in direction A along the second rollers 106.

Figure 4:
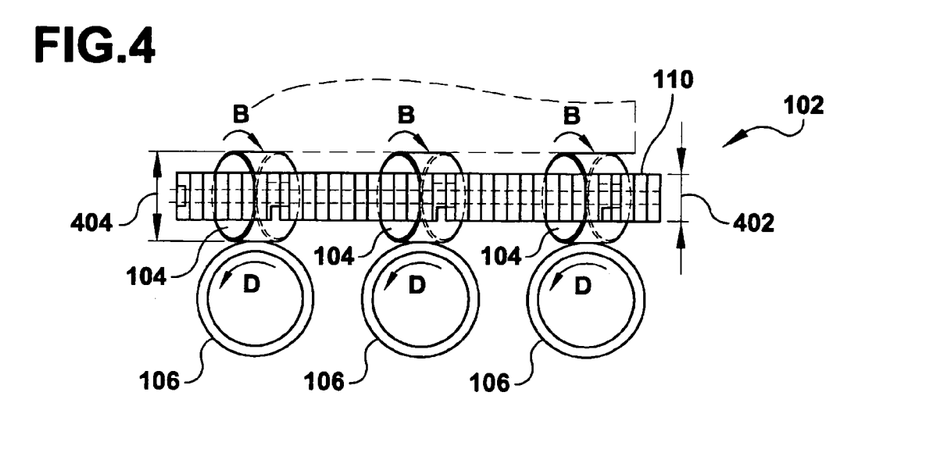
FIG. 4 is a front view of an embodiment of a section of the conveyor of FIG. 1.

FIG. 4 is a front view of an embodiment of a section of the conveyor of FIG. 1. The mat-top chain 110 has a height dimension 402 that is smaller than the height dimension 404 of the first rollers 104. As the belt 102 travels in direction A and the first rollers 104 engage the second rollers 106, the first rollers rotate in direction B and the second rollers 106 rotate in an opposing direction D (counterclockwise in the orientation shown in FIG. 4).

Figure 5:
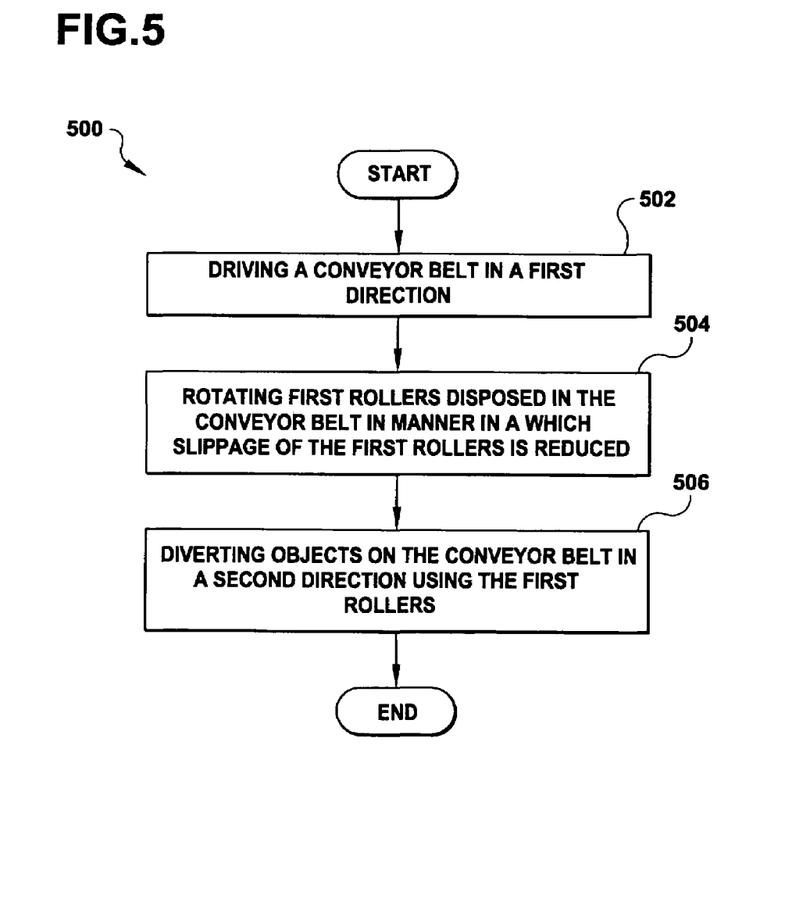
FIG. 5 is a flow diagram that illustrates an embodiment of a method for conveying objects.

FIG. 5 is a flow diagram that illustrates an embodiment of a method 500 for conveying objects on a conveyor belt. Beginning with block 502 of FIG. 5, the method 500 includes driving a conveyor belt in first direction.

In block 504, first rollers within the conveyor belt are rotated in a manner in which slippage of the first rollers is reduced. For example, as the conveyor belt travels in direction A, the first rollers engage second rollers that are likewise free to rotate.

In block 506, the objects on the conveyor belt 102 are diverted in a second direction using the first rollers. The objects can be displaced towards either the sides or the middle of the conveyor belt.

Figure 6A:
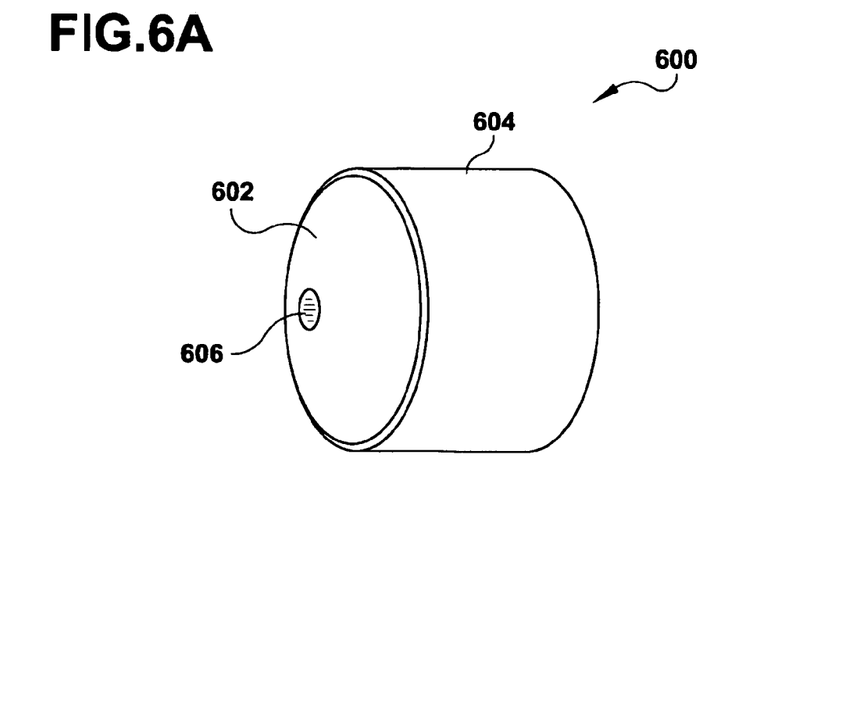
FIG. 6A is a perspective view of an example embodiment of a first roller.
Figure 6B:
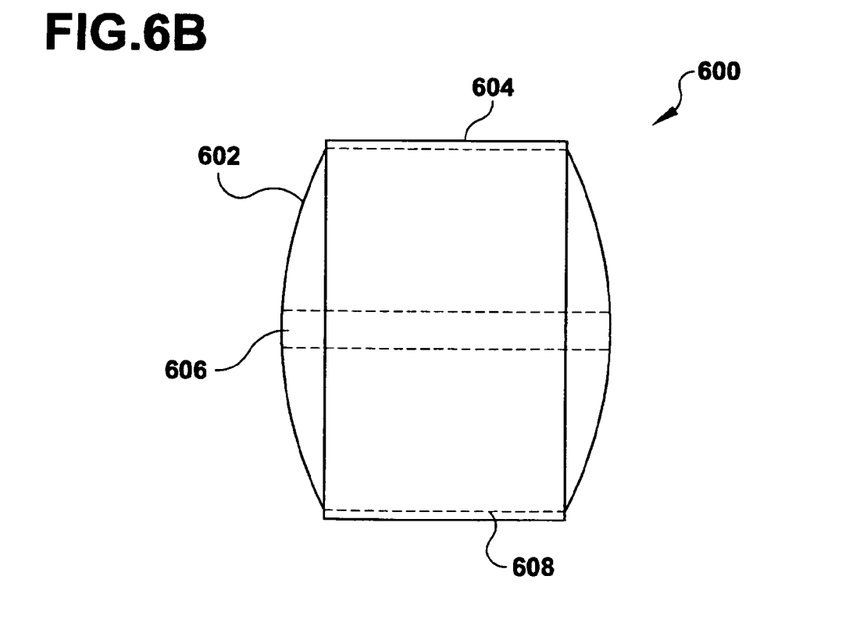
FIG. 6B is a side view of the roller of FIG. 6A.

FIGS. 6A and 6B illustrate an example embodiment for the first rollers described above. As indicated in these figures, a roller 600 comprises an inner wheel 602 surrounded by an outer tire 604. By way of example, the inner wheel is constructed of a lightweight, rigid material, such as a plastic or metal, and the outer tire 604 is made of a resilient material having a high coefficient of friction, such as a rubber. The outer-tire 604 is provided around an outer surface 608 of the inner wheel 602 (FIG. 6B). The inner wheel 602 also comprises an opening 606 through which a roller axle may pass to rotatably mount the roller 600 in a conveyor belt (e.g., belt 102). Due to the outer tire 606, improved gripping of a surface, such as that of the second rollers, can be achieved thereby reducing slippage.

It should be emphasized that the above-described embodiments are merely possible examples. Many variations and modifications may be made to the above-described embodiments. All such modifications and variations are intended to be included herein within the scope of this disclosure.

What is claimed is:

1. A conveyor comprising:
    a conveyor belt including a plurality of cavities and a plurality of diverting rollers, each diverting roller being disposed in a cavity; and
    at least one transverse roller having an axis that extends in a direction of travel of the conveyor belt and that can couple to the plurality of diverting rollers to cause the diverting rollers rotate as they travel along the at least one transverse roller.

2. The conveyor as defined in claim 1, wherein the at least one transverse roller is located underneath the conveyor belt and the at least one transverse roller rotates in a direction transverse to the rotational direction of the diverting rollers as the conveyor belt travels.

3. The conveyor as defined in claim 1, wherein the at least one transverse roller rotates in a direction substantially perpendicular to the direction of belt travel when the at least one transverse roller couples to the plurality of diverting rollers.

4. The conveyor as defined in claim 1, wherein the conveyor belt comprises mat-top chains that comprise hinge elements that link multiple mat-top chains together to form the conveyor belt.

5. The conveyor as defined in claim 4, wherein the hinge elements comprise interleaved hinge elements having axially aligned holes.

6. The conveyor as defined in claim 1, further comprising a plurality of support members that support the conveyor belt.

7. The conveyor as defined in claim 1, wherein the at least one transverse roller is vertically displaceable toward or away from the conveyor belt, wherein when the at least one transverse roller is displaced toward the conveyor belt and engages the plurality of diverting rollers the at least one transverse roller rotates the diverting rollers as the conveyor belt travels.

8. The conveyor as defined in claim 1, wherein rotation of the at least one transverse roller causes the first rollers to rotate with reduced slippage.

9. The conveyor as defined in claim 1, wherein the first rollers are aligned in the cavities at an angle relative to the direction of belt travel enabling the first rollers to convey objects in a direction transverse to the direction of belt travel.

10. A conveyor comprising:
   a conveyor belt that travels in a linear motion, the conveyor belt including a plurality of cavities and a plurality of diverting rollers, each diverting roller disposed in a cavity; and
   a plurality of transverse rollers having axes that extend along a direction of belt travel, the transverse rollers being free to rotate and being adapted to couple to the plurality of diverting rollers, wherein such coupling causes the diverting rollers to rotate in a first direction transverse to the direction of belt travel and the transverse rollers to rotate in a second direction transverse to the direction of belt travel, the second direction being different from the first direction.

11. The conveyor as defined in claim 10, wherein the plurality of transverse rollers are located underneath the conveyor belt.

12. The conveyor as defined in claim 10, wherein the plurality of transverse rollers rotate in a direction substantially perpendicular to the direction of belt travel.

13. The conveyor as defined in claim 10, wherein the conveyor belt comprises mat-top chains that comprise hinge elements that link multiple mat-top chains together to form the conveyor belt.

14. The conveyor as defined in claim 13, wherein the hinge elements comprise interleaved hinge elements having axially aligned holes.

15. The conveyor as defined in claim 10, further comprising a plurality of support members that support the conveyor belt.

16. The conveyor as defined in claim 10, wherein the plurality of transverse rollers are vertically displaceable toward or away from the conveyor belt, wherein when the plurality of transverse rollers are displaced toward the conveyor belt and engage the plurality of diverting rollers, the transverse rollers rotate the first rollers as the conveyor belt travels.

17. A method for conveying objects, the method comprising:
   driving a conveyor belt in a first direction;
   coupling diverting rollers disposed in the conveyor belt with a transverse roller that is free to rotate in a direction that is transverse to the first direction, wherein the driving of the modular conveyor belt produces rotary motion in both the diverting rollers and the transverse roller as a result of their coupling; and
   diverting objects from the conveyor belt using the diverting rollers.

18. The method as defined in claim 17, wherein rotating the diverting rollers comprises selectively rotating the diverting rollers with the transverse roller by vertically displacing the transverse roller toward the conveyor belt and engaging the diverting rollers.

19. The method as defined in claim 17, wherein rotating the diverting rollers comprises rotating the diverting rollers at an angle that is different from the first direction.

20. The conveyor as defined in claim 1, wherein linear motion of the conveyor belt generates rotary motion in the plurality of diverting rollers and the at least one transverse roller.

21. The conveyor as defined in claim 20, wherein the at least one transverse roller is not driven except by the linear motion of the conveyor belt and the coupling with the plurality of diverting rollers.

22. The conveyor as defined in claim 10, wherein linear travel of the conveyor belt produces rotary motion in the plurality of diverting rollers and the at least one transverse roller.

23. The conveyor as defined in claim 22, wherein the at least one transverse roller is not driven except by the linear motion of the conveyor belt and the coupling with the plurality of diverting rollers.

24. A conveyor comprising:
   a conveyor belt that travels in a linear motion including a plurality of cavities and a plurality of diverting rollers, each diverting roller disposed in a cavity, the cavities and diverting rollers being laterally spaced across a width of the conveyor belt such that a plurality of rows of diverting rollers are provided parallel to the linear motion; and
   a transverse roller having an axis that extends in the direction of the linear motion and that is located under one of the plurality of rows to couple to a row of diverting rollers;
   wherein the diverting rollers rotate in a direction transverse to the linear motion as the conveyor belt travels when the diverting rollers are coupled to the transverse roller.

25. The conveyor as defined in claim 24, wherein the transverse roller is vertically displaceable toward or away from the conveyor belt, wherein when the transverse roller is displaced toward the conveyor belt and engages the row of diverting rollers, the transverse roller rotates in a direction that is transverse to the linear motion.

26. The conveyor as defined in claim 24, wherein the diverting rollers are aligned in the cavities of the conveyor belt at an angle that is different from the linear motion enabling the diverting rollers to divert objects transverse to the linear motion.

\* \* \* \* \*

(12) EX PARTE REEXAMINATION CERTIFICATE (7657th)
United States Patent
Fourney (10) Number: US 6,968,941 C1
(45) Certificate Issued: Aug. 3, 2010

(54) APPARATUS AND METHODS FOR CONVEYING OBJECTS (75) Inventor: Matthew L. Fourney, Laurel, MD (US)

(73) Assignee: Laitram, L.L.C., Harahan, LA (US)

Reexamination Request:
No. 90/009,449, May 15, 2009

Reexamination Certificate for:
| | |
|---|---|
| Patent No.: | 6,968,941 |
| Issued: | Nov. 29, 2005 |
| Appl. No.: | 10/719,805 |
| Filed: | Nov. 21, 2003 |

(51) Int. Cl.
*B65G 17/00* (2006.01)

(52) U.S. Cl. .................. 198/779; 198/370.03; 198/384
(58) Field of Classification Search ............... None
See application file for complete search history.

(56) References Cited

U.S. PATENT DOCUMENTS

| | | | |
|---|---|---|---|
| 1,931,454 A | 10/1933 | Anderson | |
| 2,566,417 A | 9/1951 | Holm | |
| 3,292,767 A | 12/1966 | Lobdell et al. | |
| 3,373,860 A | 3/1968 | Lindgren et al. | |
| 3,550,756 A | 12/1970 | Komylak | |
| 3,653,489 A | 4/1972 | Tullis et al. | |
| 3,675,760 A | 7/1972 | Burrage et al. | |
| 3,857,472 A | 12/1974 | Klint | |
| 3,973,672 A | 8/1976 | Frost | |
| 4,039,074 A | 8/1977 | Maxted | |
| 4,143,756 A | 3/1979 | Chorlton | |
| 4,262,794 A | 4/1981 | Bourgeois | |
| 4,264,002 A | 4/1981 | Van Der Schie | |
| 5,074,405 A | 12/1991 | Magolske et al. | |
| 5,090,553 A | 2/1992 | Focke | |
| 5,092,447 A | 3/1992 | Wyman | |
| 5,101,958 A | 4/1992 | LeMay et al. | |
| 5,145,049 A | 9/1992 | McClurkin | |
| 5,190,137 A | 3/1993 | Tas | |
| 5,238,099 A | 8/1993 | Schroeder et al. | |
| 5,333,722 A | 8/1994 | Ouellette | |
| 5,400,896 A | 3/1995 | Loomer | |
| 5,551,543 A | 9/1996 | Mattingly et al. | |
| 5,769,204 A | 6/1998 | Okada et al. | |
| 6,073,747 A | 6/2000 | Takino et al. | |
| 6,148,990 A | 11/2000 | Lapeyre et al. | |
| 6,244,426 B1 | 6/2001 | Murano et al. | |
| 6,269,933 B1 | 8/2001 | Schuitema et al. | |
| 6,318,544 B1 | 11/2001 | O'Connor et al. | |
| 6,343,685 B1 | 2/2002 | Hofer | |
| 6,367,616 B1 | 4/2002 | Lapeyre et al. | |
| 6,382,393 B2 | 5/2002 | Itoh et al. | |
| 6,401,936 B1 | 6/2002 | Isaacs et al. | |
| 6,494,312 B2 * | 12/2002 | Costanzo | 198/779 |
| 6,571,937 B1 | 6/2003 | Costanzo et al. | |
| 6,648,125 B1 | 11/2003 | Bershadsky | |
| 6,681,922 B2 | 1/2004 | Corley et al. | |
| 6,758,323 B2 | 7/2004 | Costanzo et al. | |
| 7,073,651 B2 | 7/2006 | Costanzo et al. | |

FOREIGN PATENT DOCUMENTS

JP 08-277029 10/1996

* cited by examiner

*Primary Examiner*—Peter C. English (57) ABSTRACT

Disclosed are conveyors and methods for making the conveyors. In one embodiment, a conveyor comprises a modular conveyor belt that includes a plurality of mat-top chains having a plurality of cavities and a plurality of first rollers disposed in the cavities of the mat-top chains. The conveyor further includes at least one second roller that operatively couples to the first rollers such that the first rollers rotate as the conveyor belt travels along the second roller. The invention can also be construed as providing the method for conveying objects. The method can comprise the steps of driving a modular conveyor belt in a direction of belt travel; rotating a plurality of first rollers disposed into the modular conveyor belt in a manner in which slippage of the first rollers is reduced; and conveying objects on the modular conveyor belt using the rotating first rollers.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 24-26 is confirmed.

Claim 11 is cancelled.

Claims 1, 2, 10 and 17 are determined to be patentable as amended.

Claims 3-9, 12-16 and 18-23, dependent on an amended claim, are determined to be patentable.

New claims 27-41 are added and determined to be patentable.

1. A conveyor comprising:
   a *continuous* conveyor belt including a plurality of cavities and a plurality of diverting rollers, each diverting roller being disposed in a cavity;
   and at least one transverse roller *located underneath the continuous conveyor belt and* having an axis that extends in a direction of travel of the *continuous* conveyor belt and that can couple to the plurality of diverting rollers to cause the diverting rollers *to* rotate as they travel along the at least one transverse roller.

2. The conveyor as defined in claim 1, wherein [the at least one transverse roller is located underneath the conveyor belt and] the at least one transverse roller rotates in a direction transverse to the rotational direction of the diverting rollers as the conveyor belt travels.

10. A conveyor comprising:
    a *continuous modular* conveyor belt that travels in a linear motion, the *continuous modular* conveyor belt including a plurality of cavities and a plurality of diverting rollers, each diverting roller disposed in a cavity; and
    a plurality of transverse rollers *located underneath the continuous modular conveyor belt* having axes that extend along a direction of belt travel, the transverse rollers being free to rotate and being adapted to couple to the plurality of diverting rollers, wherein such coupling causes the diverting rollers to rotate in a first direction transverse to the direction of belt travel and the transverse rollers to rotate in a second direction transverse to the direction of belt travel, the second direction being different from the first direction.

17. A method for conveying objects, the method comprising:
    driving a *continuous modular* conveyor belt in a first direction;
    coupling diverting rollers disposed in *cavities in* the *continuous modular* conveyor belt with a transverse roller *located underneath the continuous conveyor belt* that is free to rotate in a direction that is transverse to the first direction, wherein the driving of the modular conveyor belt produces rotary motion in both the diverting rollers and the transverse roller as a result of their coupling; and
    diverting objects from the *continuous modular* conveyor belt using the diverting rollers.

*27. The conveyor of claim 1 further comprising a plurality of transverse rollers aligned across a width of the continuous conveyor belt in a direction perpendicular to the direction of belt travel.*

*28. The conveyor of claim 1 wherein the plurality of diverting rollers comprise plastic wheels that include outer rubber layers and the at least one transverse roller comprises an elongated metal roller that includes a eurethane outer sleeve.*

*29. The conveyor of claim 1 wherein a coefficient of friction exists between the diverting rollers and the at least one transverse roller to reduce slippage.*

*30. The conveyor of claim 1 wherein rotation of the at least one transverse roller causes at least one diverting roller to rotate with reduced slippage.*

*31. The conveyor of claim 1 wherein the at least one transverse roller couples with the plurality of diverting rollers causing the diverting rollers to rotate and trace a helical path on the transverse roller.*

*32. The conveyor of claim 6 wherein the at least one transverse roller is located between support members.*

*33. The conveyor of claim 1 wherein the at least one transverse roller is displaceable to move into and out of contact with the diverting rollers.*

*34. The conveyor of claim 10 wherein the plurality of transverse rollers are aligned across a width of the continuous conveyor belt in a direction perpendicular to the direction of belt travel.*

*35. The conveyor of claim 10 wherein the plurality of diverting rollers comprise plastic wheels that include outer rubber layers and the plurality of transverse rollers comprise elongated metal rollers that include a eurethane outer sleeve.*

*36. The conveyor of claim 10 wherein a coefficient of friction exists between the diverting rollers and the transverse rollers to reduce slippage.*

*37. The conveyor of claim 10 wherein rotation of the transverse rollers causes the diverting rollers to rotate with reduced slippage.*

*38. The conveyor of claim 10 wherein the transverse rollers couple with the diverting rollers causing the diverting rollers to rotate and trace a helical path on the transverse rollers.*

*39. The conveyor of claim 10 wherein at least one of the plurality of transverse rollers is displaceable to move into and out of contact with the diverting rollers.*

*40. The conveyor of claim 15 wherein at least one of the plurality of transverse rollers is located between support members.*

*41. The method of claim 17 including the step of moving the transverse roller into and out of contact with the diverting rollers.*

* * * * *